United States Patent [19]

Bayer et al.

[11] 4,290,918

[45] Sep. 22, 1981

[54] SOLUBLE POLYMERIZATION CATALYSTS, PRODUCTION OF THE SAME AND THEIR USE

[75] Inventors: Ernst Bayer; Mohamed Kutubuddin, both of Tubingen, Fed. Rep. of Germany

[73] Assignee: Heyl & Co., Chemisch-Pharmazeutische Fabrik, Fed. Rep. of Germany

[21] Appl. No.: 44,679

[22] Filed: Jun. 1, 1979

[30] Foreign Application Priority Data

Aug. 17, 1978 [DE] Fed. Rep. of Germany ....... 2835944

[51] Int. Cl.$^3$ .............................................. B01J 31/12
[52] U.S. Cl. ......................... 252/431 R; 260/429 CY; 260/429 J; 260/429.9; 260/430; 260/429.1; 260/429.3; 260/429.5; 260/438.5 R; 260/439 R; 260/439 CY; 260/448 R
[58] Field of Search .................... 252/431 R; 260/430, 260/429.9, 429 J, 429 CY

[56] References Cited

U.S. PATENT DOCUMENTS

| | | | |
|---|---|---|---|
| 2,630,419 | 3/1953 | Wakefield | 260/429.9 X |
| 2,933,474 | 4/1960 | Handy et al. | 260/429.9 X |
| 3,488,316 | 1/1970 | Flavell et al. | 260/429.9 X |
| 3,565,800 | 2/1971 | Wade | 260/429.9 X |
| 4,090,013 | 5/1978 | Ganslaw et al. | 252/431 R X |
| 4,098,727 | 7/1978 | Haag et al. | 252/431 R X |
| 4,173,575 | 11/1979 | Carlock | 252/431 R X |
| 4,179,401 | 12/1979 | Garnett et al. | 252/430 X |

*Primary Examiner*—Helen M. S. Sneed
*Attorney, Agent, or Firm*—Steinberg & Raskin

[57] ABSTRACT

Soluble catalysts for polymerizations are provided which are formed from an organic polymeric material containing at least one functional group bound to a metal, metal ion or metal complex. These catalysts can be used to promote all types of polymerizations, such as of vinyl compounds, etc.

These catalysts are produced by reacting the basic polymer with a metal salt or metal complex, particularly of a metal of the third through the eighth subgroups of the periodic table or of the third and fourth main groups of the periodic table, the catalyst being formed by exchange with the metal or metal ion being bound to the polymer.

8 Claims, No Drawings

SOLUBLE POLYMERIZATION CATALYSTS, PRODUCTION OF THE SAME AND THEIR USE

BACKGROUND OF THE INVENTION

Low molecular, homogeneous catalysts for polymerization have been suggested and used for the polymerization of many monomers to macromolecules. This is valid for radical, anionic and cationic catalysts and for organometallic mixed catalysts. Difficulties with homogeneous polymerization catalysts often occurs in connection with the separation of the catalyst and the polymer. As a result, the properties of the polymer are undesirably influenced or subsequent expensive separations become necessary.

SUMMARY OF THE INVENTION

Generally speaking, the present invention provides soluble polymeric polymerization catalysts for homogeneous polymerizations in solution under mild conditions, which catalysts can be easily separated from the formed polymerisate and provide for the production of polymerisates of improved characteristics.

It is accordingly a primary object of the present invention to provide new and metal-containing polymerization catalysts wherein the metal is linked to a basic polymer.

It is another object of the present invention to provide for the use of such catalysts to promote various polymerization reactions.

It is a yet further object of the present invention to provide for the production of the catalysts of the invention.

The present invention further includes as an object the production of soluble polymerization catalysts which can be easily separated from polymerisates when the catalysts are used to promote polymerization reactions.

Other objects and advantages of the present invention will be apparent from a further reading of the specification and of the appended claims.

With the above and other objects in view, the present invention mainly comprises metal-containing soluble, polymeric polymerization catalysts wherein an organic basic polymer contains by linkage to at least one functional group thereof a bound metal, metal ion or metal complex.

The use of the polymerization catalysts of the present invention for the production of polymers provides considerable advantages in that the formed polymer is only very slightly contaminated with the catalyst or the polymer can be easily separated from the catalyst. As a consequence, the polymers produced with the catalysts of the present invention exhibit better properties and linear polymers of high molecular weight up to several million can be produced as a result.

The basic polymers which are linked to the metals, metal ions, or metal complexes in accordance with the present invention are preferably such polymers as polyvinyl alcohols, polyvinyl ethers, polyvinyl amines, polyvinyl pyrrolidones, polyesters, polyurethanes, polyacrylic acids, polymethacrylic acids, polystyrenes, polyethylene glycols, polypropylene glycols or polyethylene imines, or mixed polymerisates or mixed condensates of the corresponding monomers.

The metals, metal ions, metal salts or metal complexes are bound or absorbed at the hydroxyl, carboxyl, or amino functions of the basic polymers to produce the catalysts of the invention. It might be necessary according to the invention to further functionalize the basic polymer before the reaction thereof with the metal component. Thus, for example, polystyrenes can be functionalized to poly(p-hydroxymethylstyrenes) which are suitable polymers for the production of homogeneous polymerization catalysts in accordance with the invention.

In addition to the above mentioned hydroxyl, amino and carboxyl groups of the polymers for the binding of the metal components, other functional groups for this purpose include imino, carboxyl, triarylphosphine, trialkylphosphine, arylalkylphosphine and mercapto groups. The molecular weight range of the soluble polymerization catalysts of the present invention can vary greatly. Molecular weights of below 1000 generally provide no advantage since polymers produced therewith are relatively impure. The upper limit of the molecular weight is only limited by solubility. In the case of linear polymers this upper limit is in general about 10 million. In accordance with the present invention it has been found that all linear or slightly branched macromolecules are suitable as starting polymers for the production of the metal containing polymerization catalysts of the invention.

The metal components of the catalysts of the invention are preferably metals of the third through the eighth subgroups or the third and fourth main groups of the periodic system, particularly Ti, U, V, Zr, Co, Ni, Cr, Mo, W, Al, Zn and/or Fe.

For the production of the soluble, macromolecular polymerization catalysts of the invention the polymer which is used is bound to the metal ions by at least one functional group of the polymer while by complexing the remaining coordination positions are saturated up to the maximum coordination number by low molecular weight ligands. Suitable ligands are CO, phosphines, particularly alkyl phosphines and/or aryl phosphines, halogens or halogenides, cyanides, aromatics, particularly benzene, cyclopentadienyl and donor molecules of the fifth or sixth main groups of the periodic system. The macromolecular metal-containing polymerization catalysts can be neutral, anionic or in cationic form.

To produce the catalysts of the present invention, the basic polymer can be dissolved in aqueous solution or in an organic solvent and reacted with metal salts or metal complexes. The metals become bound and, if desired, excess low molecular weight metal compounds are separated by ultra filtration. The thus produced polymeric metal catalysts can in many cases be used for the purposes of the present invention without further purification. Further purification of the polymeric metal catalysts can be effected, however, for example by precipitation, recrystallization, extraction or chromatography.

Metal compounds that can be used for the reaction with the polymers to produce the polymeric metal catalysts of the invention can be in the form of salts or complexes of the metals of the subgroups and main groups of the periodic system. Particularly good catalytic activity is found according to the invention with polymeric catalysts of titanium, vanadium, chromium, aluminum, uranium, tin, iron, cobalt and nickel.

The following table sets forth several particularly advantageous basic polymers for the purposes of the present invention:

TABLE

| Basic polymer | Functionalizing of the basic polymers by the following groups |
|---|---|
| 1. Polystyrene | $-(CH_2)_n-OH$ (n = 1–5) |
| | $-NH_2$ |
| | $-(CH_2)_n-NH_2$ (n = 1,2) |
| | $-CH-CH_3$ |
| | $\quad\ \|$ |
| | $\quad OH$ |
| | $-COOH$ |
| 2. Polyallylalcohol | $-OH$ |
| 3. Polyvinylalcohol | $-OH$ |
| 4. Polyacrylic acid | $-COOH$ |
| 5. Polyvinylamine | Amino groups, Aldimines |
| 6. Polyethylenimine | prim.sec.tert.Amino groups |
| | Aldimino groups |
| | Iminodi-acetic acid |
| 7. Copolymers of 1 and 3 | $-OH$ |
| 8. Copolymers of 1 and 2 | $-OH$ |
| 9. Copolymers of 1 and 4 | $-COOH$ |
| 10. Polyethylenglycol | |
| 11. Polypropylenglycol | |
| 12. Polyoxymethylene | $-OH$ |
| 13. Polybutylenglycol | |
| 14. Copolymers of 10 and 11 | |
| 15. Polyvinylpyrrolidinone | amide groups |
| 16. Hydrolyzed Polyvinylpyrrolidinone | Amide, COOH— and NH groups |
| 17. Polyvinylpyridine | Pyridine groups |

Examples of preferred metals which can be bound with basic polymers of the above type with low molecular ligands are:

| | | |
|---|---|---|
| $-Cp_2TiCl_n$ | (n = 1,2) | (Cp = Cyclopentadienyl) |
| $-CpTiCl_n$ | (n = 2,3) | |
| $-TiCl_n$ | (n = 3,4) | |
| $-CoCl_n$ | (n = 1-3) | |
| $-AlX_3$ | (X = Cl, Br) | |
| $-VCl_n$ | (n = 2-4) | |
| $-ZrX_n$ | (X = Cl, Br; n = 3,4) | |
| $-MoCl_n$ | (n = 4,5) | |
| $-UCl_3$ | | |
| $-WCl_3$ | | |
| $-CrCl_n$ | (n = 2,3) | |
| $-FeCl_n$ | (n = 2,3) | |
| $-Ti(OR)_3$ | (R = $C_2H_5$; i-Propyl, n-Propyl) | |
| $-NiX_n$ | (X = Cl, CN, Br; n = 1,2) | |

The polymeric, soluble metal catalysts of the present invention can be used to catalyze the polymerization of ethylene and selected substituted ethylenes. For this purpose the catalysts are dissolved in organic solvents or water. The selected monomer is added to the solution. The reaction can be effected at room temperature and normal pressure or at higher temperatures and under pressure. The precipitated polymer is removed by filtration or decantation. The polymerization can also be effected continuously by the continuous addition of monomer and continuous removal of the polymer.

The monomers that can be polymerized to polymers with the new polymerization metal catalyst of the invention are: ethylene, propylene, vinylacetate, vinyl amine derivatives, acrylic acid esters, methacrylic acid esters, butadiene as well as alkyl butadienes, allyl compounds, acrylonitrile, halogenated ethylene, ethylene oxide, styrene as well as mixtures of various monomers. In accordance with the present invention, polymerisates of these monomers or copolymerisates of various monomers can be produced.

The polymerization can be effected in solution and the precipitated polymerization product can be continuously or discontinuously removed. These polymerizations result in the production predominantly of linear polymers and in accordance with the present invention the polymerization can be so controlled that very high molecular weights, up to $10^7$ can be obtained. The catalysts can always again be used for the polymerization purposes since they do not become deactivated over long periods of time and because of the fact that they are soluble they do not become bound or adsorbed by the produced polymers.

For the purpose of catalyzing polymerization reactions, the polymeric catalysts of the present invention are generally used in mol ratios between $10^{-2}$ to $10^{-6}$.

DESCRIPTION OF PREFERRED EMBODIMENTS

The following examples are given to further illustrate the present invention. The scope of the invention is not, however, meant to be limited to the specific details of the examples.

EXAMPLE 1

Production of a polyethyleneglycol-bound cyclopentadiene-dichloro-titanium catalyst:

Polyethyleneglycols of molecular weights 1000, 2000, 3000, 6000, 10,000 and 20,000 are used for the production of titanium catalysts, all of the polyethyleneglycols being reacted under the same conditions. The polyethyleneglycols (PEG) are at times first purified by precipitation from benzene or tetrahydrofurane with diethyl ether and dried for a long time under high vacuum over $P_4O_{10}$. In many cases it is also necessary to subject the PEG to ultrafiltration.

0.5 m Mol of the polyethyleneglycol of the above given molecular weights are dissolved in 70–100 ml benzene and, under air and moisture exclusion, 1.2 m Mol of $CpTiCl_3$ (Cp=Cyclopentadiene) in 20–60 ml tetrahydrofurane are slowly added dropwise. The reaction mixture is permitted to react under refluxing for 5 hours. It is then precipitated with diethylether, again dissolved in benzene/tetrahydrofurane and again precipitated with diethylether. The yield amounts to between 90–95% of the theoretical. The polymeric titanium complex contains 64–90% of the theoretical calculated content of titanium (theoretical: 2 titanium for each mol of PEG; found: 1.3–1.8 Mol Ti).

EXAMPLE 2

Production of a PEG bound dicyclopentadiene-monochloro-titanium complex:

0.5 m Mol of polyethyleneglycol are reacted with 1.2 m Mol $Cp_2TiCl_2$ in 40 ml tetrahydrofurane in accordance with Example 1. The yield is 90% PEG-$(TiCp_2Cl)_2$ containing 1.8 Mol titanium per each Mol PEG.

EXAMPLE 3

Production of a PEG-aluminiumchloride-catalyst:

2 m Mol PEG of the molecular weights set forth in Example 1 are reacted under refluxing as in Example 1 for 5 hours with 4 m Mol $AlCl_3$ in 40 ml tetrahydrofurane, precipitated two times with diethylether and dried over $P_4O_{10}$. The yield is 90% PEG-aluminumchloride catalyst. The aluminum content is 1.3 Mol Al per Mol PEG.

EXAMPLE 4

Production of PEG-aluminiumalkylene:

0.5 m Mol of PEG-(AlCl$_2$)$_2$ obtained according to Example 3 are dissolved in tetrahydrofurane under absolute exclusion of air and moisture. Independently therefrom there is prepared under air and moisture exclusion from lithium and alkyl iodide about 1.2 m Mol of a solution of lithium alkyl in tetrahydrofurane. This solution is filtered and added to the PEG-(AlCl$_2$)$_2$ solution and stirred at room temperature for 1 and ½ hours. The reaction product is then precipitated under exclusion of air with diethyl ether. The aluminum content is 1.25 mol per Mol PEG.

EXAMPLE 5

Production of PEG-bound halogen-metal compounds from PEG-disodium salt and metal halogenides:

The production of the sodium salt of polyethylene glycol of various molecular weights (1,000–20,000) is effected under extremely careful exclusion of moisture under pure nitrogen or argon. Ketyl-purified, nitrogen-saturated tetrahydrofurane serves as solvent. 1 m Mol of polyethyleneglycol is permitted to react at room temperature for 1 hour, with a 4-times excess of a 50% sodium dispersion. The excess sodium is then filtered off. The thus prepared sodium salt can be isolated by precipitation. The solutions separated from the sodium can be directly further worked up for reaction with the metal halogenides.

There is then added thereto 1 m Mol PEG prepared solution of the disodium salt with 2 m Mol of the metal salt set forth in the Table below, the reaction taking place at room temperature under protective gas and with exclusion of water. The reaction is complete in about 1–2 days. The precipitated sodium halogenide is filtered off and the polymeric metal halogen compound is precipitated by diethylether. Further purification by ultra filtration is possible.

TABLE

Metal compounds produced as set forth in Example 5
(solvent always tetrahydrofurane)

| Compound | m Mol PEG-Na produced in situ | m Mol Metal halogenide utilized | Yield | Metal content % of the theoretical |
|---|---|---|---|---|
| PEG-(CpTiCl$_2$)$_2$ | 0.5 m Mol | 1.0 CpTiCl$_3$ | 90% | 75% |
| PEG-(Cp$_2$TiCl) | 1.0 m Mol | 2.0 Cp$_2$TiCl$_2$ | 95% | 65% |
| PEG-(TiCl$_3$)$_2$ | 2.0 m Mol | 4.0 TiCl$_4$ | 85% | 87% |
| PEG-(CoCl$_2$)$_2$ | 1.0 m Mol | 2.0 CoCl$_2$ | 91% | 82% |
| PEG-(VCl$_2$)$_2$ | 1.0 m Mol | 2.0 VCl$_3$ | 86% | 72% |
| PEG-(VOCl$_2$)$_2$ | 0.5 m Mol | 1.0 VOCl$_3$ | 95% | 70% |
| PEG-(AlCl$_2$)$_2$ | 0.5 m Mol | 1.0 AlCl$_3$ | 85% | 88% |
| PEG-(ZrCl$_3$)$_2$ | 0.5 m Mol | 1.0 ZrCl$_4$ | 96% | 92% |
| PEG-(UCl$_3$)$_2$ | 0.5 m Mol | 1.0 UCl$_4$ | 70% | 68% |
| PEG-(MoCl$_4$) | 0.5 m Mol | 1.0 MoCl$_5$ | 83% | 70% |

EXAMPLE 6

Synthesis of a dicyclopentadiene-dichloro-titanium (IV)-complex with covalent fixing of a cyclopentadienyl radical on polystyrene:

Linear polystyrene with a molecular weight of 34,000 is utilized as starting material, which is so chloromethylated in conventional manner that about 5% of the theoretical possible chloromethyl groups are introduced into the polystyrene.

5 g chloromethylated polystyrene are dissolved in 100 ml tetrahydrofurane under air and moisture exclusion and 0.35 g sodium cyclopentadienyl are added and the reaction continued at room temperature for one day. The polymer is purified by ultra filtration. Yield: 4.7 g.

Thereafter, in situ prepared methyl lithium the anion of poly-(cyclopentadienyl-methylene-styrene) as lithium salt in tetrahydrofurane is produced. Yield: 4.5 g. Thereafter 4.5 g lithium salt is reacted with 0.218 g cyclopentadienyl titanium trichloride in tetrahydrofurane. Yield: 4 g with 80% of the theoretical. (1.5–1.7% Ti).

EXAMPLE 7

Production of a poly(hydroxymethylstyrene-trichloro-titanium(IV))-complex:

21 g of hydroxymethylated polystyrene produced in conventional manner (molecular weight 34000) loaded with 5% of the theoretical possible hydroxymethyl groups are reacted at room temperature under careful exclusion of moisture with 0.04 mol titanium tetrachloride in benzene/tetrahydrofurane. The reaction is carried out for 10 hours at room temperature. The resulting product is then subjected to ultrafiltration for 36 hours through a polyimine membrane (exclusion range—molecular weight 10,000). Excess titanium tetrachloride and hydrochloride formed by ligand exchange are thus removed. The polymeric titanium complex which is retained can directly be used as a catalyst in solution. For purification purposes the retained material may be evaporated under vacuum to dryness. Yield: 19.5 g polymeric titanium complex with 1.8% titanium.

EXAMPLE 8

Precipitation polymerization of styrene with PEG (TiCpCl$_2$)$_2$ at room temperature:

0.5 g of the catalyst produced according to Example 1 is dissolved in 50 ml methanol under air and moisture exclusion by warming (one half minute at 40° C.) and 25 ml styrene are added. The reaction vessel is subsequently again evacuated and under protective gas (N$_2$/argon) stirred at room temperature. After 5–7 days the precipitated polymer is filtered off under suction. Yield: 9–14 g polystyrene.

The filtrate contains the catalyst. It can again be mixed with monomer and the polymerization carried out many times over several months under the same conditions. There is no loss of catalyst activity. The formed polystyrene is found to have by gel permeation-chromatography and light scattering measurement a molecular weight of 5–6.10$^6$.

The catalysts produced according to Examples 2–5 can be used under analogous conditions in the same manner. In place of methanol or ethanol it is possible to use as solvent, for example, tetrahydrofurane, benzene, toluene, xylene, etc. The molecular weight is then somewhat lower. The polymerization time can be shortened by using higher temperatures.

EXAMPLE 9

Precipitation polymerization of acrylonitril with PEG (TiCpCl$_2$)$_2$ at room temperature:

0.5 g of the catalyst produced according to Example 1 are dissolved in 15 ml methanol under air and moisture exclusion by warming (½ minute at 40° C.) and 25 ml of acrylonitrile are added. The reaction vessel is subsequently again evacuated and under protective gas (N$_2$/argon) stirred at room temperature. After three days the precipitated polymer is filtered off under suction. Yield: 14–16 g polyacrylonitrile.

The filtrate contains the catalyst. It can again be reacted with monomer and the polymerization can be effected many times over several months under the same conditions. There is no loss of catalyst activity. The formed polyacrylonitrile has a molecular weight of $3-6 \times 10^6$.

The catalysts of Examples 2–5 can be used under analogous conditions. Instead of methanol or ethanol there can be used as solvent, for example, benzene, toluene and xylene. The molecular weight remains similarly high. The polymerization time can be shortened by the use of higher temperatures.

EXAMPLE 10

Precipitation polymerization of methacrylic acid methyl ester with PEG $(TiCpCl_2)_2$ at room temperature:

0.5 g of the catalyst produced according to Example 1 is dissolved in 60 ml methanol under air and moisture exclusion by warming ($\frac{1}{2}$ minute at 40° C.) and 25 ml of methacrylic acid methyl ester are added. The reaction vessel is subsequently again evacuated and under protective gas ($N_2$/Argon) stirred at room temperature. After 3 days the precipitated polymer is filtered off under suction. Yield: 15–17 g polymethacrylic acid methyl ester.

The filtrate contains the catalyst. It can again be reacted with monomer and the polymerization reaction effected often over several months under the same conditions. There is no loss of catalyst activity. The formed polymethacrylic acid methyl ester according to gel permeation-chromatography and light scattering measurements has a molecular weight of $5-6 \times 10^7$.

The catalysts described in Examples 2–5 can be used in the same manner under analogous conditions. Instead of methanol and ethanol it is possible to use as solvent benzene, toluene, tetrahydrofurane, xylene and acetone. The molecular weight remains similarly high. At higher temperatures there is obtained in shorter reaction times lower degrees of polymerization.

EXAMPLE 11

Precipitation polymerization of acrylonitrile with mixed catalyst:

1 g PEG-$(VCl_2)_2$ produced according to Example 5 and 0.5 g PEG-$[Al(CH_3)_2]_2$ catalyst produced according to Example 4 are dissolved in 50 ml benzene under air and moisture exclusion by warming ($\frac{1}{2}$ min at 40° C.) and 50 ml of acrylonitrile are added thereto. The reaction vessel is subsequently again evacuated and under protective gas ($N_2$/Argon) stirred at room temperature. After 3 days the precipitated polymer is filtered off under suction. Yield: 28–30 g polyacrylonitrile.

The filtrate contains the catalyst. The formed polyacrylonitrile has a molecular weight according to gel permeation-chromatography and light scattering measurements of $5-6 \times 10^7$. The titanium catalyst can along with PEG-$[Al(CH_3)_2]_2$ again be used under analogous conditions. Instead of benzene it is also possible to use toluene as a solvent.

EXAMPLE 12

Precipitation polymerization of isoprene with PEG-$(UCl_3)_2$:

0.5 g of the catalyst produced according to Example 5 is dissolved in 25 ml of methanol under air and moisture exclusion by warming ($\frac{1}{2}$ minute at 40° C.) and 25 ml of isoprene are added thereto. It is subsequently again evacuated and under protective gas ($N_2$/Argon) stirred at room temperature. After 5 days the precipitated oil is separated. Yield: 3–4 g polyisoprene (molecular weight less than 10,000).

EXAMPLE 13

Copolymerization of styrene-acrylonitrile with PEG-$(TiCpCl_2)_2$ at room temperature:

0.5 g of the catalyst produced according to Example 1 are dissolved in 25 ml of methanol under air and moisture exclusion by warming ($\frac{1}{2}$ minute at 40° C.) and 25 ml of styrene and 15 ml of acrylonitrile are added. It is subsequently again evacuated and under protective gas ($N_2$/Argon) stirred at room temperature. After 5–7 days the precipitated polymer is filtered off under suction. Yield: 18–19 g styrene-acrylonitrile copolymer.

The formed copolymer is found to have by gel permeation-chromatography and light scattering measurements a molecular weight of $3-4 \times 10^6$. The catalysts described in Examples 2–5 can be used under analogous conditions.

EXAMPLE 14

Copolymerization of styrene-methacrylic acid methylester with PEG$(TiCpCl_2)_2$ at room temperature:

0.5 g of the catalyst produced according to Example 1 are dissolved in 50 ml of methanol under air and moisture exclusion by warming ($\frac{1}{2}$ minute at 40° C.) and 25 ml of styrene and 15 ml of methacrylic acid methyl ester are added. The reaction vessel is subsequently again evacuated and under protective gas ($N_2$/Argon) the reaction mixture is stirred at room temperature. After 5 days the precipitated polymer is filtered off under suction. Yield: 18–20 g styrene-methacrylic acid methyl ester copolymer.

The formed copolymer is found to have by gel permeation-chromatography and light scattering measurements a molecular weight of $3-4 \times 10^6$. The catalysts of Examples 2–5 can be used in the same way under analogous conditions.

EXAMPLE 15

Copolymerization of acrylonitrile-methacrylic acid methyl ester with PEG $(TiCpCl_2)_2$ at room temperature:

0.5 g of the catalyst produced according to Example 1 are dissolved in 50 ml of methanol under air and moisture exclusion by warming ($\frac{1}{2}$ minute at 40° C.) and 25 ml of acrylonitrile and 15 ml of methacrylic acid methyl ester are added thereto. It is subsequently again evacuated and under protective gas ($N_2$/Argon) stirred at room temperature. After 3–4 days the precipitated polymer is filtered off under suction. Yield: 20–21 of molecular weight $2-4 \times 10^6$.

EXAMPLE 16

Copolymerization of styrene-vinylacetate with PEG$(TiCpCl_2)_2$ at room temperature:

0.5 g of the catalyst produced according to Example 1 are dissolved in 25 ml of benzene under air and moisture exclusion by warming ($\frac{1}{2}$ minute at 40° C.) and 25 ml of styrene and 1.5 ml of vinyl acetate are added. After subsequent evacuation it is stirred under protective gas ($N_2$/Argon) at room temperature. After 7 days the polymer is precipitated with methanol. Yield: 6–8 g.

EXAMPLE 17

Precipitation polymerization of acrylonitrile with polystyrene-bound titanocen dichloride at room temperature:

0.5 g of the catalyst produced according to Example 6 are dissolved in 25 ml of benzene under air and moisture exclusion and 25 ml of acrylonitrile are added. After subsequent evacuation it is stirred at room temperature under protective gas ($N_2$/Argon). After 9 days the precipitated polymer is filtered off. Yield: 5-7 g polyacrylonitrile.

While the invention has been illustrated in particular with respect to the production of specific polymeric catalysts and the use thereof for specific polymerization purposes, it is apparent that variations and modifications of the invention can be made.

What is claimed is:

1. As a soluble catalyst for polymerization reactions, an organic polymer having at least one functional group bound to a metal component and having a molecular weight of 1000-10,000,000, wherein the organic polymer is a polystyrene, polyvinyl alcohol, polyvinyl ether, polyvinyl amine, polyacrylic acid, polymethacrylic acid, polyvinyl pyrrolidone, polyethylene glycol, polypropylene glycol, polyethylene imine, polyurethane, polyester or mixed polymerisate of mixed condensate of the corresponding monomer, and wherein the metal component is at least one of the metals selected from the group consisting of Ti, U, V, Zr, Co, Ni, Cr, Mo, W, Al, Zn and Fe.

2. Polymerization catalyst according to claim 1 wherein the functional group to which the metal component is bound is hydroxyl, amino, imino carboxyl, mercapto alkyl phosphine and/or aryl phosphine or wherein the metal, metal ion or metal complex forms a $\pi$-complex with the base polymer.

3. Polymerization catalyst according to claim 1 wherein the metal component is also bound to low molecular ligands or anions.

4. Polymerization catalyst according to claim 3 wherein the ligand is carbonmonoxide, a phosphine, halogen, halogenide, cyanide, olefine, aromatic, cyclopentadienyl or donor molecule of the fifth or sixth main groups of the periodic table.

5. Polymerization catalyst according to claim 1 wherein the metal or component is bound to a hydroxyl group-containing basic polymer forming an alcoholate or alkoxy complex.

6. Polymerization catalyst according to claim 5 wherein the hydroxyl group-containing organic basic polymer is a polyethylene glycol, monoalkoxypolyethylene glycol, monophenoxy polyethylene glycol, polyvinyl alcohol or hydroxy methylated polystyrene.

7. Method of producing the polymeric catalyst of claim 1, which comprises reacting a functional group-containing organic polymer with a metal salt or metal complex of the metal component whereby the corresponding metal becomes bound to the polymer by exchange of low molecular ligands.

8. Method according to claim 7 wherein the functional group-containing organic polymer is an organic polymer containing hydroxyl groups.

* * * * *